United States Patent [19]

Kinney

[11] 4,092,855

[45] June 6, 1978

[54] DYNAMOMETER AND COUPLING FOR A TEST STAND

[75] Inventor: Lionel L. Kinney, Peoria, Ill.

[73] Assignee: Caterpillar Tractor Co., Peoria, Ill.

[21] Appl. No.: 763,316

[22] Filed: Jan. 28, 1977

[51] Int. Cl.² ............................................. G01L 3/16
[52] U.S. Cl. ........................................ 73/134; 73/135
[58] Field of Search .................... 73/134, 135, 99, 118

[56] References Cited

U.S. PATENT DOCUMENTS

| 599,522 | 2/1898 | Barus | 73/135 |
|---|---|---|---|
| 854,720 | 5/1907 | Dawson | 73/135 X |
| 2,348,175 | 5/1944 | Cripps | 73/134 |
| 3,075,381 | 1/1963 | Lelis | 73/118 |
| 3,301,359 | 1/1967 | Cole et al. | 192/4 |
| 3,791,498 | 2/1974 | Wassermann | 73/134 X |

*Primary Examiner*—Charles A. Ruehl

*Attorney, Agent, or Firm*—Wegner, Stellman, McCord, Wiles & Wood

[57] ABSTRACT

A dynamometer including a housing comprised of first and second parts relatively rotatable about an axis and defining a chamber, at least one brake element within the chamber carried by each part, the brake elements being in adjacency and relatively movable within the chamber, a motor and spring for moving the elements to frictionally engage and disengage the same, coolant inlet and outlet ports to the chamber, and a base mounting the housing for rotation about the axis, a transducer connected to one of the housing parts and the base, and a coupling device connected to the other of the parts and including a chuck for driven engagement with a mechanical power source, the coupling being axially extendable and allowing limited play in the radial direction.

15 Claims, 5 Drawing Figures

FIG. 2.

DYNAMOMETER AND COUPLING FOR A TEST STAND

BACKGROUND OF THE INVENTION

This invention relates to testing apparatus for mechanical power sources as, for example, vehicles, and to various facets of such testing apparatus.

Manufacturers of quality mechanical power sources almost invariably test the source prior to releasing the same for sale to ensure that the source is performing properly and up to its rated capability. In some cases, the testing has been performed with dynamometers, while in others, the testing has been performed by other means.

Dynamometer testing is generally preferred over other forms of testing by reason of an increased reliability of test results due to the elimination of subjective judgment on the part of operators and/or observers through the use of measuring apparatus. However, dynamometer testing is not altogether satisfactory, particularly where the mechanical power source being tested is operated at a relatively low speed and/or has a high torque output. For example, in crawler-type vehicles, where the testing is to be performed at the final drive, rotational speeds of 100 rpm or less and high torque outputs are invariably present. Conventional dynamometers cannot adequately measure desired operational parameters in such cases, or, if capable, are extremely costly thereby discouraging their use.

As a result, testing of power sources such as crawler-type vehicles has generally been performed on a test track under the control of an operator. The test results therefore can be unreliable due to the subjectivity involved, i.e., the opinion of the operator during the testing procedure, and the results will frequently vary from one operator to the next.

These difficulties are considerably compounded where the power source is a vehicle of the type having power outputs, each of which is independently driven through a hydrostatic transmission or the like. Even though the components for each output may be nominally matched, small differences in the hydraulic system for each output will exist unless a time consuming matching of components is made prior to their assembly into a given vehicle. Because of the expense involved, such a matching is not commercially feasible with the consequence that the operator of the vehicle during the test must observe any tendency of one system to perform more efficiently than the other when commanded to perform identically. If the mismatching is not perceived, when the vehicle is operated by a purchaser, continuous corrective action may be required during vehicle operation to cause the same to move in a straight line, for example, as well as during other operational procedures.

Moreover, many testing systems designed to eliminate the subjectivity involved with purely human testing on a test track or the like require time-consuming setup procedures in affixing the testing equipment to the power source or the vehicle to be tested and/or utilize space consuming, relatively mechanically complex, coupling devices, as treadmill type structures. Such structures are not only expensive, but by reason of their mechanical construction, are subject to periodic breakdown. In some cases, such structures may themselves absorb a sufficient amount of power from the source being tested as to render the test results unreliable.

SUMMARY OF THE INVENTION

The present invention is directed to overcoming one or more of the above problems.

According to one facet of the invention, there is provided a new and improved test stand for vehicles having opposed motive drive outputs which includes a means for supporting the vehicle to be tested in a predetermined position with its motive drive outputs free from engagement with surrounding structure. There is also provided a pair of dynamometers, one on each side of the supporting means along with a pair of releasable coupling means, one drivingly associated with each dynamometer, adapted to be engaged with a corresponding one of the motive drive outputs of the vehicle on the supporting means. Means are provided for mounting at least the releasable coupling means for movement toward and away from each other and the supporting means. The stand enables rapid setup of a vehicle for testing.

According to another facet of the invention, there is provided a dynamometer formed of a housing comprised of first and second relatively rotatable parts which define a chamber. At least one brake element is disposed within the chamber and carried by each part with the brake elements being in adjacency and relatively movable within the chamber. Means are provided for moving the elements to frictionally engage or disengage the same and there are provided coolant inlet and outlet ports to the chamber. A base mounts the housing for rotation about the rotational axis of the first and second parts and a transducer is connected to one of the housing parts and the mounting means. A coupling device is connected to the other of the parts for driven engagement with the mechanical power source. The dynamometer is particularly suited for use in testing mechanical power sources having low speed, high torque outputs.

According to another facet of the invention, there is provided a coupling that is axially extendable and radially self-aligning and which includes a shaft having radially outwardly directed splines. A first tube slidably receives the shaft and has radially inwardly directed splines on the interior thereof and in engagement with the splines on the shaft and a convex, splined surface on the exterior thereof and remote from one end thereof. The center of the convex splined surface lies on the longitudinal axis of the shaft. One set of the radially directed splines has a relatively short axial length and the other has a relatively long axial length. A second tube receives the first tube and has interior splines in engagement with the convex splined surface and the remainder of its interior surface spaced from the exterior of the first tube. Means, including a second convex splined surface having its center on the longitudinal axis of the shaft and longitudinally spaced from the first tube convex splined surface are provided. Means are provided and are carried by the second tube including a splined interior surface in engagement with the second convex splined surface. The splines on the shaft in the first tube allow axial extension of the coupling, while the convex splined surfaces provide limited play to allow for self-alignment of components in the radial direction.

The invention also contemplates a method of testing a mobile mechanical power source which comprises still another facet of the invention. The inventive method includes the steps of supporting the mechanical power source on a stand with its rotary power output exposed and free from engagement with surrounding structure, providing a dynamometer with a rotary chuck input in axial alignment with the output spaced therefrom, axially advancing at least the chuck into axial positive engagement with the output and operating the mobile mechanical power source to drive the dynamometer.

Other objects and advantages will become apparent from the following specification taken in connection with the accompanying drawings.

DESCRIPTION OF THE PREFERRED EMBODIMENT

An exemplary embodiment of a testing apparatus made according to the invention is shown in the drawings and described herein in connection with the testing of crawler-type vehicles, particularly hydrostatic crawler-type vehicles. However, it is to be understood that the invention is not so limited and can be employed with efficacy in the testing of nonhydrostatic crawler-type vehicles, noncrawler-type vehicles, nonvehicular power sources, power takeoffs on vehicles, and, in the case of the axially extendable, self-aligning coupling shown and described herein, may be utilized in environments totally apart from testing apparatus. The scope of the present invention, and the various facets thereof, therefore, is not to be determined by the drawings or description herein, but by the claims appended hereto.

GENERAL DESCRIPTION

Figure 1:
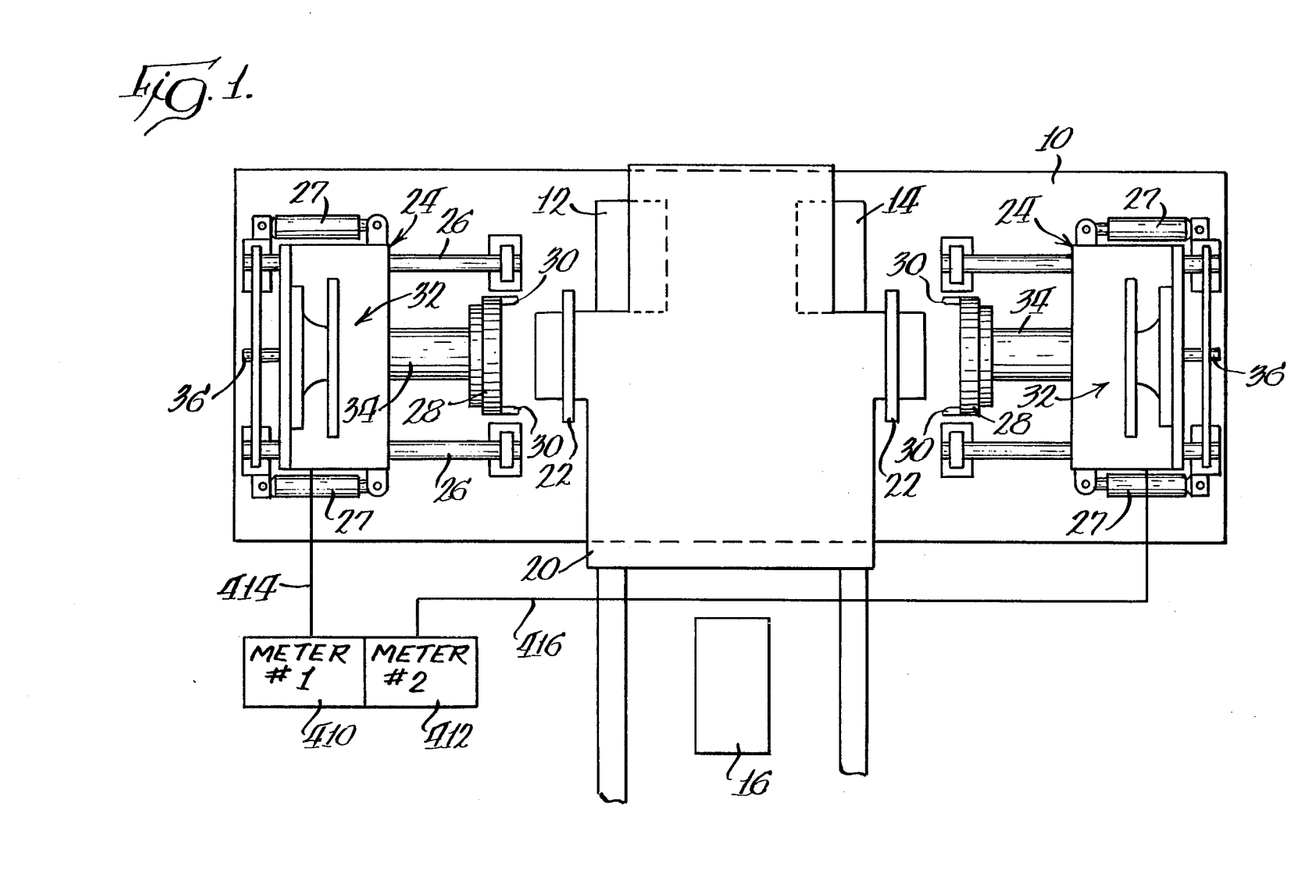
FIG. 1 is a somewhat schematic, plan view of a test stand made according to the invention.

The general organization of a testing apparatus made according to the invention is best illustrated in FIG. 1 which is a somewhat schematic view looking down on a test area. The floor surface 10 of the test area mounts three upwardly extending pedestals 12, 14 and 16, the pedestals 12 and 14 being adapted to support the rear end of a vehicle, shown in outline form at 20, and the pedestal 16 adapted to support the front end of the vehicle. The vehicle 20 is a hydrostatic, crawler-type loader and includes opposed motive power outputs 22 which are in the form of drive sprockets for driving respective endless track chain assemblies (not shown).

In the typical case, the vehicle 20 will be supported on the pedestals 12, 14 and 16 prior to the assembly of the track chains thereto so that the sprockets 22 are free from contact therewith. The use of the pedestals 12, 14 and 16 serves to elevate the vehicle 20 above the floor 10 such that the sprockets 22 are not in engagement therewith. While not of great relevance to the present invention, it is contemplated that the pedestals 12 and 14 will support the vehicle through the usual ripper bar lugs at the rear of the vehicle, while the pedestal 16 will support the vehicle at the usual point of connection for the typical equalizer bar assembly.

Preferably, some sort of adjustable means are provided in connection with the supporting surface of each of the pedestals 12, 14 and 16 so that a variety of differing models of vehicles can be supported on the stand with their sprockets 22 in the same position with respect to the floor 10 and other test stand components, irrespective of differing vehicle dimensions.

On opposite sides of the pedestals 12, 14 and 16, there are disposed dynamometer assemblies, each generally designated 24. Since the dynamometer assemblies 24 are identical, only one will be described in greater detail hereinafter.

The dynamometer assemblies 24 are mounted on longitudinally extending rails 26 for movement towards and away from each other and the pedestals 12, 14 and 16, and thus a vehicle 20 supported thereby. Reciprocal motors 27, typically double-acting hydraulic cylinders, are employed for the purpose. Preferably, the rails 26 are parallel to, but spaced from, the axis of rotation of the sprockets 22.

Each dynamometer assembly 24 includes a releasable coupling 28 shown in the form of a chuck having axially extending teeth 30 which are sized to be releasably received between the teeth on the associated ones of the sprockets 22 to positively couple the associated dynamometer assembly 24 to the associated sprocket 22.

Each dynamometer assembly 24 further includes a dynamometer, generally designated 32, which, as will be seen, is in the form of an oil cooled, hydraulically engaged, spring disengaged, disc brake having a rotary input. The rotary input of each dynamometer 32 is coupled to the associated chuck 28 by an axially extendable, radially self-aligning coupling 34. Each coupling 34 may be selectively extended or retracted by a reciprocal motor such as an associated hydraulic cylinder 36.

The arrangement is such that the rotary input of each dynamometer 32 is coaxial with the axis of rotation of the corresponding sprocket 22 with the couplings 34 and the chucks 28 being rotatable about the same axis.

In the usual case, the vehicles to be tested, prior to assembly of the tracks thereto, will be supported on the pedestals 12, 14 and 16 with the dynamometer assemblies 24 positioned by the motors 27 to be at a relatively remote location. Through operation of the motors 27, the dynamometer assemblies 24 will be advanced axially of the sprockets 22 to some predetermined position. At that point in time, the motors 36 will be actuated to extend the respective couplings 34 to cause the chucks 28 to axially positively engage the corresponding one of the sprockets 22. Alternately, the motors 27 may move the assemblies to cause engagement of the chucks, with movement terminated when a predetermined back pressure in the motors 27 is reached. Misalignment between the chucks 28 and the corresponding sprockets 22 in the radial direction is accommodated by the couplings 34, the teeth 30 on the chucks 28 tending to cam themselves into proper engagement with the sprockets 22.

The vehicle engine may then be started and various tests performed. For example, the rotational speed of the sprockets 22 at various engine throttle setting may be measured by suitable takeoffs from the dynamometer assemblies 24 to be described in greater detail hereinafter. Also, the brakes defining the dynamometers 32 may be wholly or partially engaged to obtain torque readings from each of the outputs defined by the sprockets 22 and, where the vehicle is of the type having independent hydrostatic drives for each of the sprockets 22, various adjustments to attain proper balancing may be made.

After the testing procedure has been completed, the dynamometer assemblies 24 and the chucks 28 may be retracted out of engagement with the sprockets 22, the vehicle 20 removed, and the track assemblies assembled to the vehicle after it has been removed from the pedestals 12, 14 and 16.

It is to be particularly observed that the arrangement illustrated in FIG. 1 can be employed advantageously with, for example, vehicles having outputs other than sprockets. For example, chucks could be configured to align with the lugs associated with the rear wheels of a typical passenger car or truck. Alternately, other forms of releasable couplings other than the chucks 28 could be utilized to engage, from an axial direction, track assemblies. As still a further alternative, only one of the dynamometer assemblies 24 could be employed to engage, for example, the power takeoff of a vehicle which typically might open to the rear thereof rather than to the sides as illustrated in FIG. 1.

DETAILED DESCRIPTION

Figure 2:
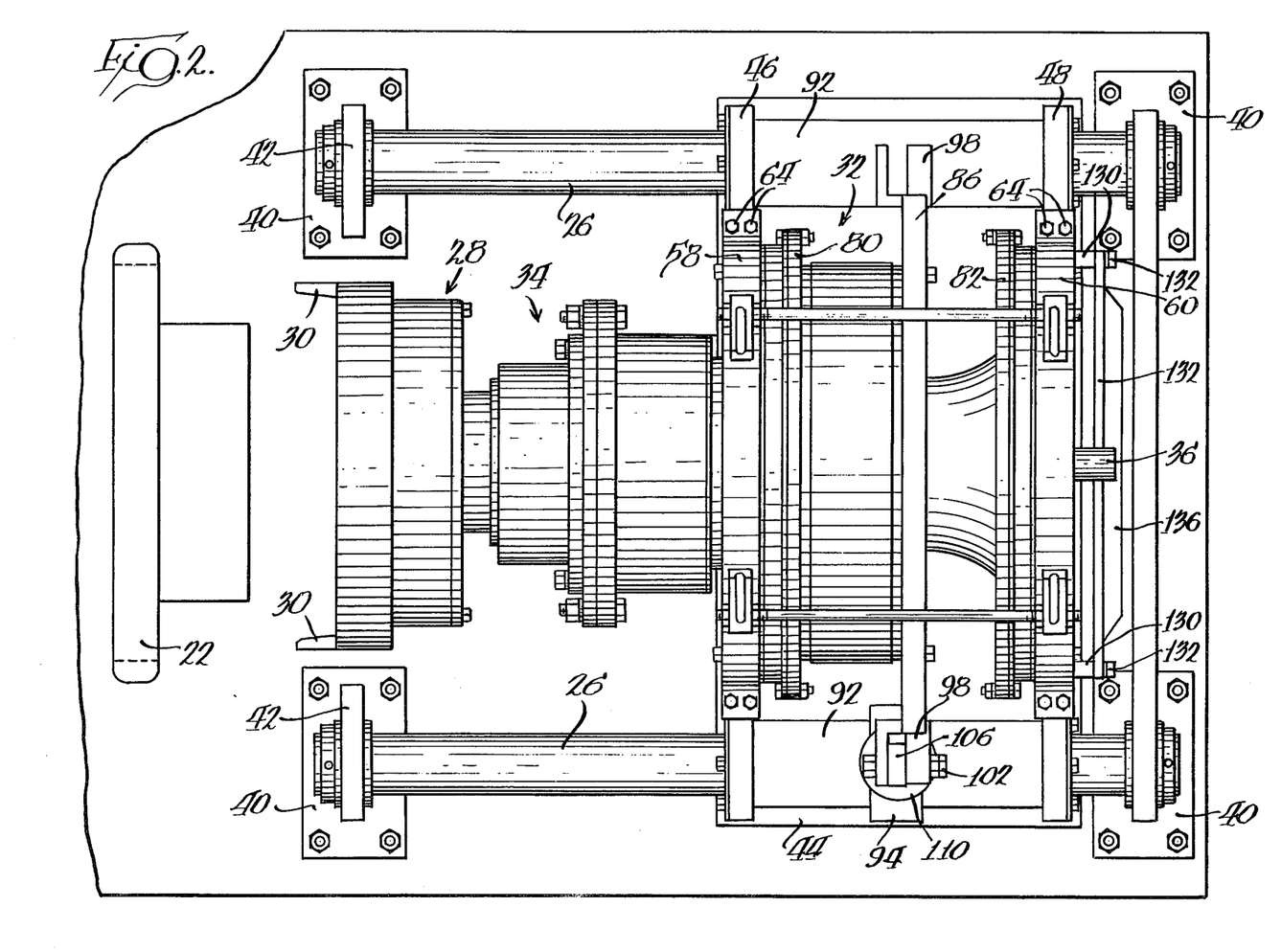
FIG. 2 is an enlarged, plan view of one dynamometer used in the test stand.
Figure 3:
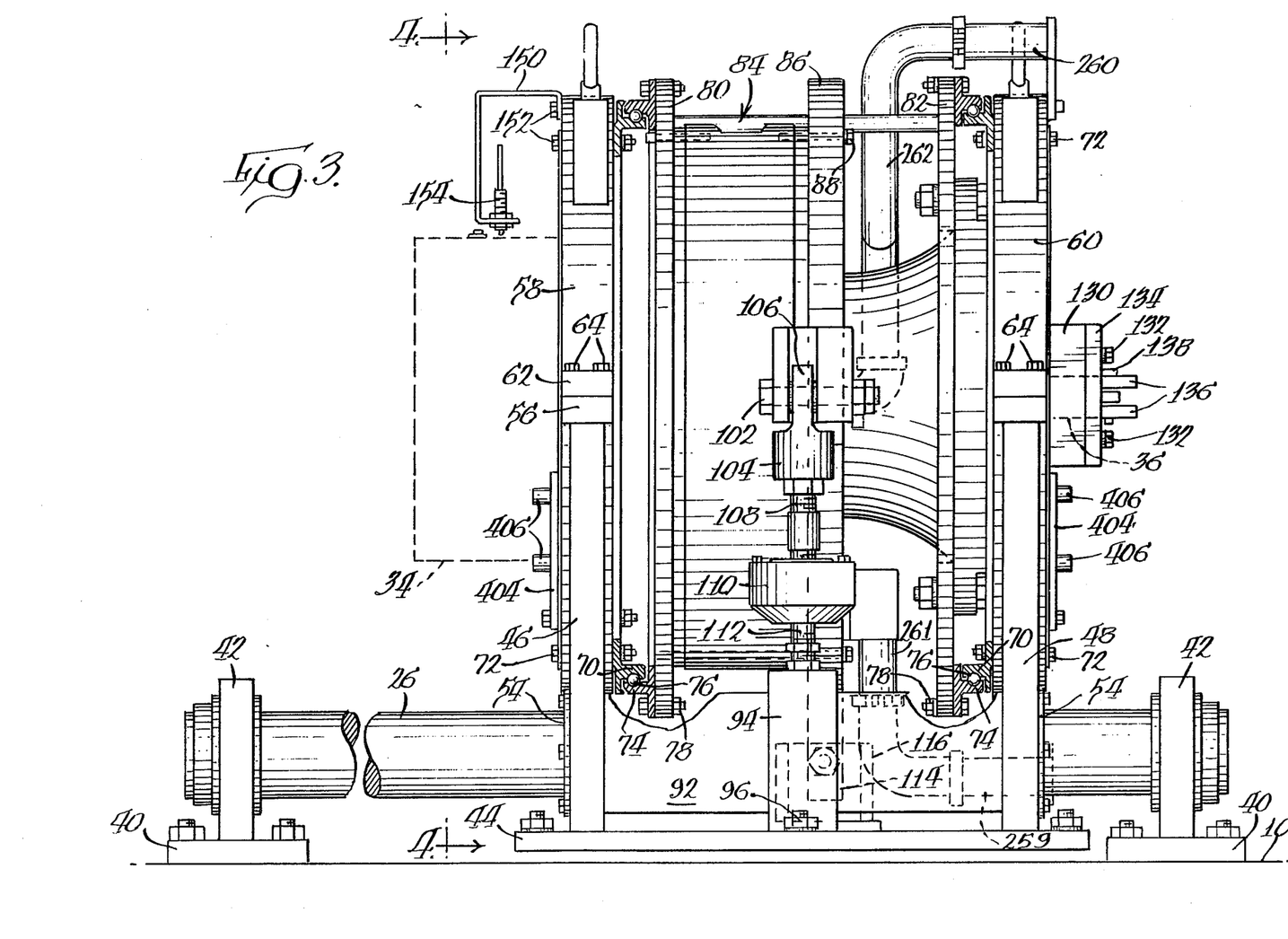
FIG. 3 is a side elevation of the dynamometer with parts shown in section for clarity.
Figure 4:
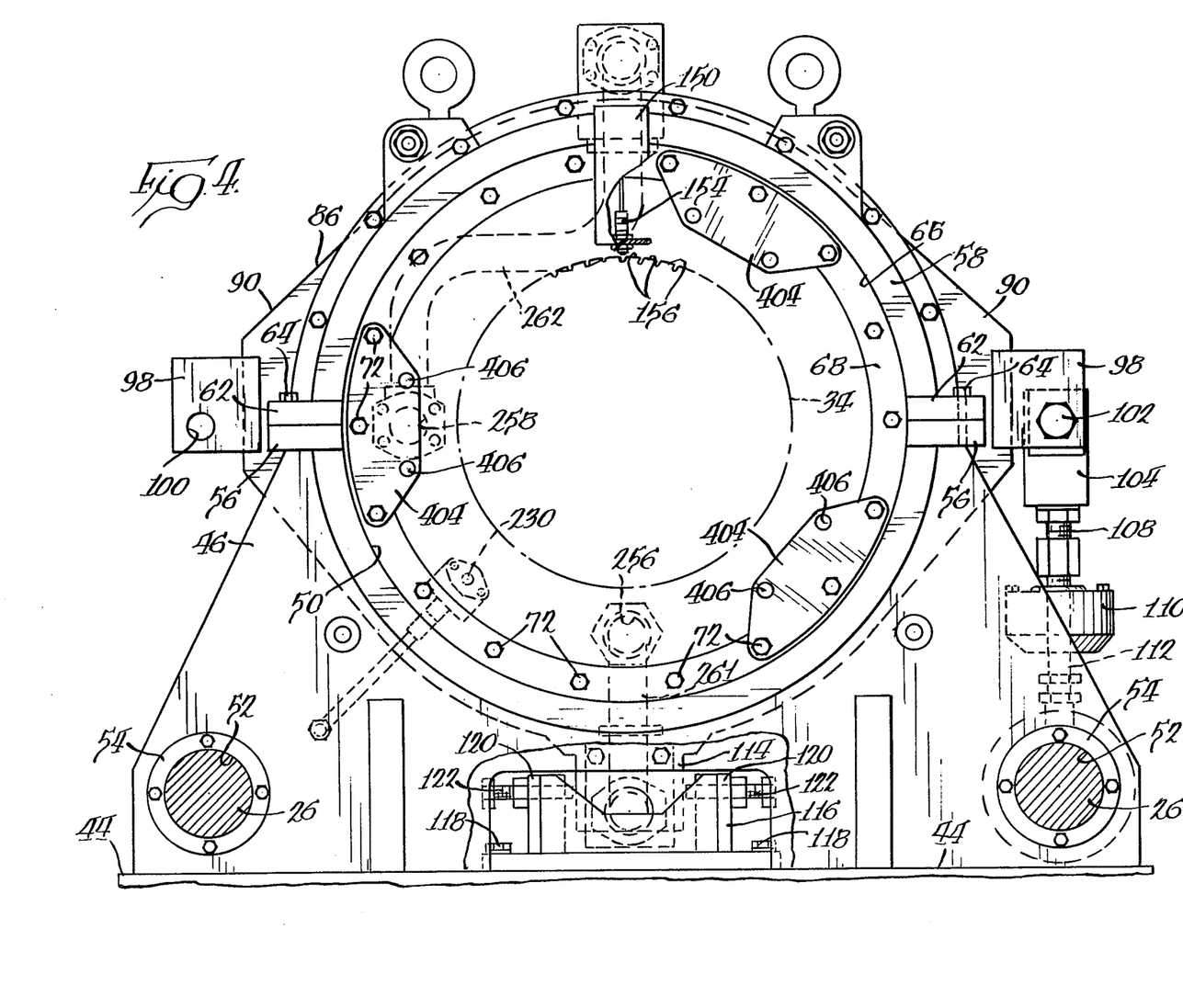
FIG. 4 is a sectional view taken approximately along the line 4—4 in FIG. 3.

With reference now to FIGS. 2, 3 and 4, one of the dynamometer assemblies 24 will be described in detail. As best seen in FIGS. 2 and 3, mounting plates 40 are bolted to the floor 10 and include upwardly extending, apertured blocks 42 which receive respective ends of associated ones of the rails 26 to stationarily mount the same on the floor 10.

A base plate 44 mounts upwardly extending, spaced plates 46 and 48, each having an upwardly open, semi-cylindrical opening 50 which serves as a cradle for the dynamometer 32. The plates 46 and 48, near their lowermost ends, include openings 52 fitted with slide bearings 54 which receive corresponding ones of the rails 26. At their upper ends, each of the plates 46 and 48 is provided with radially outwardly directed, generally horizontally extending flanges 56. Semicircular retainers 58 and 60, at their lower ends, have similar flanges 62 so that, by means of bolts 64, the retainers 58 and 60 may be secured to the plates 46 and 48, respectively.

Each retainer 58 and 60 has a central semicircular opening 66 which, together with the opening 50 in each of the base plates 46 and 48 define a pair of circular openings for mounting the dynamometer 32 to the base defined by the plates 44, 46 and 48. Rings 68 (FIG. 4) are relatively loosely received and retained in respective ones of the circular openings and may be rotated therein if sufficient force is applied, for purposes to be seen, and the interface of the rings 68 and the openings may be greased to facilitate such rotation. Each ring 68 mounts an inner race 70 (FIG. 3) of a respective bearing by means of bolts 72. Each inner race 70 is complemented by an outer race 74 and a plurality of rolling elements 76, illustrated as ball bearings, are interposed between the inner and outer races 70 and 74 of each such bearing.

The outer races 74 are secured as by bolts 78 to front and rear adapter plates 80 and 82, respectively, which, in turn, are secured to a housing, generally designated 84, for the dynamometer 32. As a consequence, it will be appreciated that each dynamometer 32 is journalled for rotation in its base.

Midway between the adapter plates 80 and 82, a torque arm 86 is secured as by bolts 88 to the dynamometer housing 84. As best seen in FIG. 4, the torque arm 86 has oppositely directed tongues 90, one on each side of the dynamometer, only one of which may be used at a given time. In particular, if the rightmost tongue 90 is utilized in a manner to be described in greater detail hereinafter, in the dynamometer utilized to the left of the pedestals 12, 14 and 16, as viewed in FIG. 1, then for the righthand dynamometer, the leftmost tongue 90 appearing in FIG. 4 would be utilized, while the righthand one would not. However, when exceptional accuracy is required, a weight (not shown) may be secured to the normally unused tongue 90 to counterbalance the weight of a load cell and associated linkage described hereinafter.

As best seen in FIGS. 3 and 4, elongated sleeves 92 extend between the base plates 46 and 48 about the rails 26. An anchor bracket 94, which is in the shape of an inverted U, is secured by bolts 96 to the base plate 44 about one of the sleeves 92 and in substantially the same vertical plane as the torque arm 86.

Both of the tongues 90 include radially outwardly extending, birfurcated yokes 98 having bores 100 extending therethrough. The yoke 98 associated with the tongue 90 to be utilized receives a bolt 102 through its associated bore 100 and a coupling 104 includes an apertured tab 106 extending into the bifurcated yoke with the bolt 102 extending through the aperture in the tab 106. Preferably, a self-aligning bearing (not shown) is interposed between the periphery of the aperture in the tab 106 and the exterior of the bolt 102.

The lower end of the coupling 104 is coupled by means such as a threaded shaft 108 to a transducer or load cell 110. The load cell 110 is also connected, as by a threaded shaft 112, to the bight of the anchor bracket 94. Thus, while the dynamometer is journalled for rotation on the base, a part of the housing 84, including that carrying the torque arm 86, is precluded from such rotation by the connection to the base through the transducer 110. When the dynamometer is driven by a mechanical power source, rotation of the housing will be resisted by the aforementioned coupling to the base and the degree of such resistance will be measured by the compressive or tensile strain placed on the transducer 110.

The transducer 110 preferably is of conventional construction and of the type that provides an electrical output signal having a characteristic whose magnitude varies according to the degree of strain placed thereon. Such a signal is applied to a suitable electrical measuring device and is indicative of, for example, torque in certain situations to be described hereinafter. Of course, a nonelectrical transducer could be utilized as an alternative to the transducer 110, if desired.

As best seen in FIGS. 3 and 4, the torque arm 86 includes a downwardly extending tongue 114. Directly below the tongue 114 an upwardly open, U-shaped stop mechanism 116 is secured as by bolts 118 to the base plate 44. The upwardly extending arms 120 threadably receive bolts 122 which are directed toward opposite sides of the tongue 114 with their ends adjustably, slightly spaced therefrom. If, under load, the linkage including the transducer 110 were to fracture, free rotation of the housing 84, in either direction, would be substantially immediately halted by abutment of the tongue 114 against one or the other of the bolts 122 associated with the stop mechanism 116.

As best seen in FIGS. 2 and 3, rearwardly extending plates 130 are secured to the plate 48 and the retainer 60 by bolts 132 and support a horizontally extending plate 134 which extends essentially across the diameter of the dynamometer. Spaced strengthening ribs 136 project horizontally from the rear of the plate 134 and, by means of a pin 138 (shown in FIG. 3 only) pivotally mount the cylinder end of the hydraulic cylinder 36. It will be recalled that the cylinder 36 is utilized to extend or retract the chuck 28, and the manner in which such is accomplished will be described in greater detail hereinafter. The connection to the plate 134 also precludes axial movement of the housing 84 relative to the plates 46 and 48.

As seen in FIGS. 3 and 4, a generally L-shaped bracket 150 is secured with bolts 152 in inverted fashion to the clamping ring 58 so as to depend in adjacency to the coupling 34 (shown in dotted lines in FIGS. 3 and 4) which extends through the ring 68. A magnetic sensor 154 is supported by the bracket 150 and a plurality of inserts 156 of magnetic material are disposed about the periphery of the coupling 34. As a consequence, upon rotation of the coupling when coupled to the mechanical power source, for each revolution, a number of electrical pulses will be generated in the sensor 154 equal in number to the number of inserts 156. The output from the sensor 154 is fed to suitable instrumentation (not shown) to provide an indication of the rotational speed of the power source.

Figure 5:
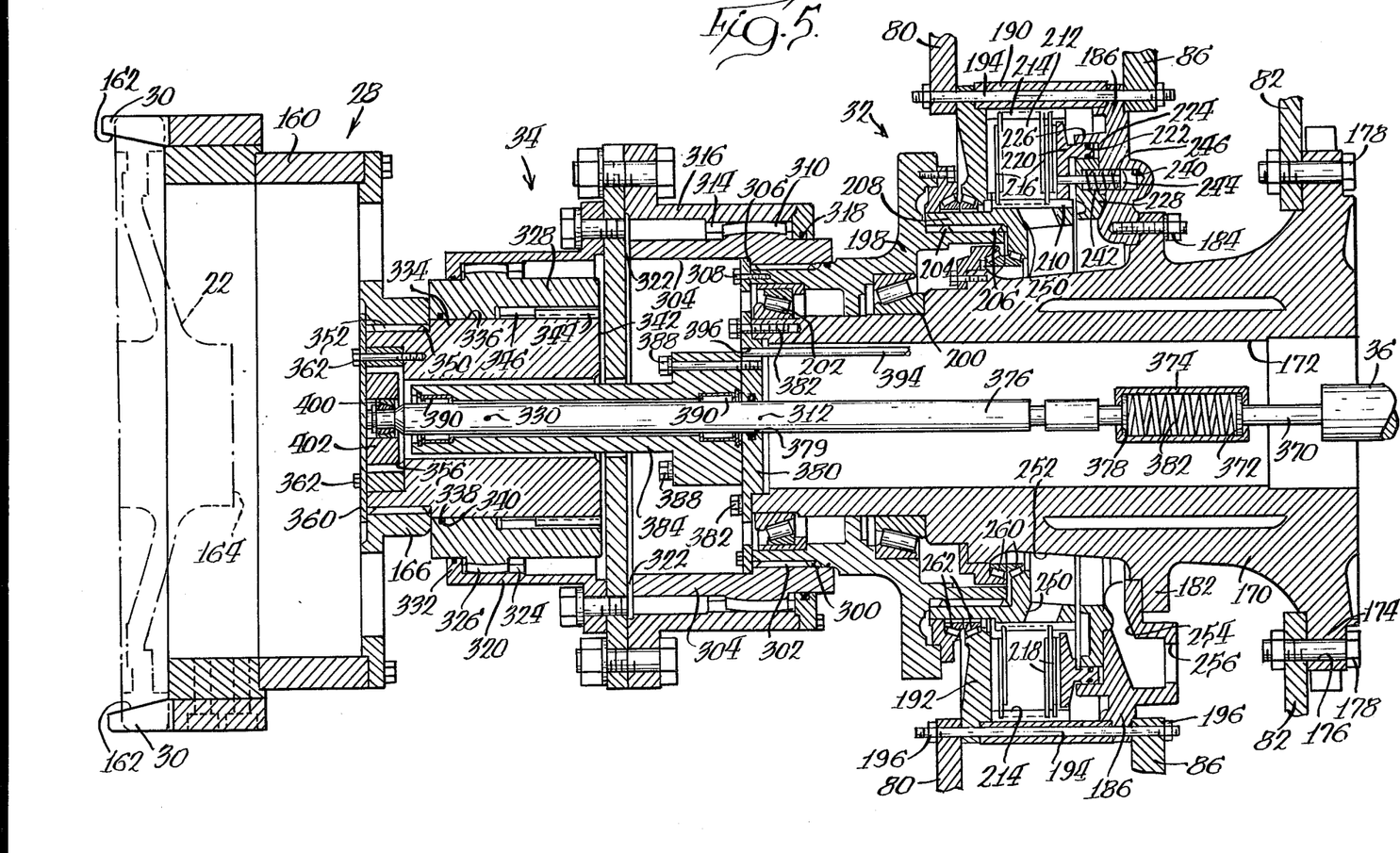
FIG. 5 is a sectional view of a dynamometer, coupling and chuck made according to a preferred form of the invention with parts omitted for clarity.

Turning now to FIG. 5, the details of the construction of the dynamometer 32, the coupling 34 and the chuck 28 are illustrated. The chuck 28 comprises one or more hollow cylinders 160 which mount the axially extending teeth 30. As seen in FIG. 5, the radially inner surfaces 162 of the teeth 30 are tapered radially inwardly from the end of the teeth 30 remote from the dynamometer. Where there there is slight axial misalignment between the sprocket 22 and the teeth 30, the tapered surface 162 serves to cam the chuck 28 into axial alignment and positive engagement with the teeth on the sprocket 22, the limited play required for such radial movement of the chuck 28 being provided by the coupling 34, as will be seen. It will be observed in FIG. 5 that the interior of the hollow cylinders 160 allow sufficient axial movement of the teeth 30 to fully, positively engage the sprocket without such movement being hindered by the outer end 164 of the hub of the sprocket 22. In other words, the hub end 164 is housed within that portion of the chuck defined by the hollow cylinders 160.

The end of the hollow cylinders 160 remote from the teeth 130 mounts a web plate 166 by which the chuck 28 is connected to the coupling 34, as will be described in greater detail hereinafter.

Turning now to the dynamometer 32, it will be recalled that the same may be generally described as an oil cooled, hydraulically engaged, spring disengaged disc brake. As illustrated, the same is a modified version of a commercial, heavy duty disc brake used in trucks or the like. The same includes a somewhat bell shaped casting 170 having a central passage 172 through which drive train components of a truck would normally extend. The casting 170 includes an outwardly directed flange 174 having a plurality of bores 176 about its periphery. By means of bolts 178, the flange 174 is secured to the adapter plate 82.

Intermediate its ends, the casting 170 includes a radially outwardly directed, peripheral flange 182 which, by means of bolts 184, mounts a generally radially outwardly extending casting 186. At the radially outer extremity of the casting 186, a hollow cylinder 190 is disposed. At the end of the cylinder 190 opposite from the casting 186, there is located a radially inwardly directed casting 192. The castings 186 and 192 and the hollow cylinder 190 are secured in assembled relation and to the adapter plate 80 and the torque arm 86 by threaded studs 194 capped with nuts 196. By reason of the connection of the components just mentioned to the torque arm 86, it will be appreciated that, while journalled for rotation relative to the base, such components do not move appreciably with respect to the base, the movement being only that permitted by the transducer 110 and elastic deformation of parts when the dynamometer is under load.

The dynamometer housing 84 further includes a relatively rotatable housing part 198 which is coupled to the chuck 28 through the coupling 34 in a manner to be described in greater detail hereinafter. The housing part 198 is an annular casting having generally the configuration illustrated and is disposed about the casting 170 at its end remote from the flange 174. Thrust bearings 200 and 202 journal the housing part 198 for rotation with respect to the remainder of the housing components.

Near its rightmost end, as viewed in FIG. 5, the housing part 198 includes radially outwardly directed splines 204 which are meshed with radially inwardly directed splines 206 on the interior surface of a drum 208. The drum 208 extends to the right of the end of the housing part 198 and on its exterior surface mounts radially outwardly directed splines 210. The drum 208, the castings 186 and 192 and the hollow cylinder 194 define an annular chamber 212. The hollow cylinder 190 includes radially inwardly directed splines 214 on its interior surface and a pack of interleaved brake discs are disposed within the chamber 212 with certain discs 216 engaged with the splines 210 and others 218 of the discs carried by the splines 214. In general, the discs 216 and 218 will be disposed in alternating fashion and axially within the chamber 212.

An annular piston 220 is disposed within the chamber 212 and is axially movable therein to compress the pack discs 216 and 218 to frictionally engage the same. The piston 220 has a narrowed annular end 222 to be received in an annular chamber 224 defined by the radially inner surface of an axially extending flange 226 on the casting 186 and the radially outer surface of a ring 228 secured to the casting 186 by any suitable means (not shown). While not shown in FIG. 5, a port is located in the casting 186 in alignment with the chamber 224, the port being shown in phantom at 230 in FIG. 4. Hydraulic fluid under pressure may thus be introduced into the chamber 224 to drive the piston 220 to the left, as viewed in FIG. 5, to compress the brake pack to thereby frictionally lock the housing part 198 to the housing components including the casting 170.

The casting 186 includes a plurality of angularly spaced bores 240 which are aligned with similar bores 242 in the ring 228. A headed stud 244 is disposed within each of the bores 220 and extends through the ring 228 to be attached to the piston 220. A spring 246 is interposed between the head of the stud 244 and the ends of the associated bores 242 and thereby tends to bias the studs 244 towards the right, as viewed in FIG. 5. Thus, when hydraulic pressure against the piston 220 is relaxed, the biasing force provided by the springs 246 will move the studs 244, and thus the piston 220, to the right, as viewed in FIG. 5, to release the brake.

As seen in FIG. 5, the drum 208 is radially outwardly spaced from the exterior of the surface of the casting 170 and is provided with a plurality of generally radially extending ports 250 which establish fluid communication between the chamber 212 and a radially inner chamber 252. The casting 186, at angularly spaced positions, includes two internal conduits 254 (only one of which is shown in FIG. 5) terminating in axially directed inlet and outlet ports 256 and 258 (FIG. 4). A coolant such as oil, cooled by a heat exchanger (not shown) is directed into the port 256 to circulate within the chambers 212 and 252 to absorb the heat generated when the brake discs 216 and 218 are frictionally engaged. The chambers are sealed against leakage by seals 260 and 262.

It is significant to observe that the ports 256 and 258 are axially directed as opposed to radially directed. It will be observed from FIGS. 3 and 4 that the forces measured by the transducer 110 are generally tangential to, but spaced from, the rotational axis of the system. Axial forces placed on the system are totally ignored by the transducer 110 but radial forces are not and would affect the output of the transducer 110. By reason of the axial disposition of the ports 256, 258, radial forces due to the introduction of fluid into the housing are eliminated and therefore do not affect the transducer 110 and its output to give erroneous readings.

As seen in FIG. 3, the ports 256 and 258 are connected to axially extending, flexible conduits 259 and 260, respectively, via rigid conduits 261 and 262 to a coolant circulating system (not shown). The use of axial flexible conduits 259 and 260 and rigid conduits 261 and 262, which are nonaxial also eliminates radial, fluid flow forces. In the usual case, oil will be employed as a coolant, but in some cases, other liquid coolant mediums may be employed.

Turning now to the coupling 34, as seen in FIG. 5, the leftmost end of the housing piece 198 includes radially outwardly directed splines 300 which are meshed with radially inwardly directed splines 302 on the interior of a tube 304. The tube 304 is sealed against the housing piece by a seal 305. A plate 306 is joined with bolts 308 to the end of the housing piece 198 to capture the splines 302 on the splines 300 and prevent axial movement therebetween while interconnecting the components for mutual rotation.

The exterior of the tube 304 carries a spherical splined surface 310 having its center at the point 312 which is on the axis of rotation of the apparatus. The splines 310 are engaged with radially inwardly directed splines 314 on the interior of a tube 316. The tube 316, at its righthand end, carries a seal 318 which seals against the tube 304 just to the right of the splines 310 and the remainder of the interior of the tube 316 is spaced from the exterior of the tube 304. By reason of the splined connection employing the spherical splines 310, within the tolerances allowed, it will be appreciated that the tube 316 can cant relative to the tube 304. That is, the longitudinal axis of the tube 316 may be skewed with respect to the longitudinal axis of the tube 304 and thus the rotational axis of the assembly.

A further tube 320 is secured to the tube 316 by the various means illustrated in FIG. 5 such that an annular space 322 exists between the lefthand end of the tube 304 and the righthand end of the components rigidly secured to the tube 320. Near its lefthand end, and on the interior surface thereof, the tube 320 carries radially inwardly directed splines 324 which are meshed with a spherical splined surface 326 on the exterior of a tube 328. The spherical splined surface 326 has its center at the point 330 which lies on the rotational axis of the assemblage. The lefthand end of the tube 320 terminates in a radially inwardly directed seal carrying flange 332 which sealingly engages the tube 328 just to the left of the spherical splined surface 326. The remainder of the interior surface of the tube 320 is spaced from the exterior surface of the tube 328, again, to allow the two components to cant relative to each other about the point 330.

A tube-like shaft 334 is slidably received within the tube 328 and for the majority of its length has a smooth cylindrical surface 336 which is sealingly engaged by a seal 338 carried by a radially inwardly directed flange 340 on the lefthand end of the tube 328.

As illustrated in FIG. 5, the coupling 34, which it will be recalled is axially extendable, is shown in its retracted position, and in such a position, the righthand end 342 of the shaft 334 is axially spaced from components to the right thereof. The end 342, on the exterior surface of the shaft 334 carries radially outwardly directed splines 344 of relatively short axial length which are slidably engaged with radially inwardly directed splines 346 on the interior of the tube 328. Thus, it will be appreciated that the shaft 334 may be extended from the coupling to the left until such time as the splines 344 stop against the flange 340. Because of the long axial length of the splines 346, for any position of the shaft 334 within the tube 328 a rotary driving connection will be established.

The lefthand end of the shaft 334, at a reduced diameter section, carries radially outwardly directed splines 350 which are engaged with radially inwardly directed splines 352 carried by the hub 354 of the chuck. In addition, a cylindrical pocket 356 is located in the lefthand end of the shaft 334. A plate 360 is secured as by bolts 362 to the shaft 334 and captures the chuck on the end of the shaft 334, closes the pocket 356, and seals the coupling by seals 362 and 364.

Returning to the cylinder 36, which it will be recalled is utilized to extend or retract the coupling 34, the same is partly disposed within the interior bore 172 of the casting 170, as seen in FIG. 5, and includes an extendable rod 370 terminating in a cap 372 within a spring housing 374. A rod 376 extends from the opposite side of the housing 374 and includes a similar cap 378 within the housing 374 and opposite from the cap 372. A coil compression spring 382 is contained within the housing and interposed between the caps 372 and 378.

The rod 376 extends through a seal carrying bore 379 in a plate 380 which closes the lefthand end of the bore 172, preloads the bearings 200 and 202 to a desired degree and is held in place by a plurality of bolts 382. An elongated sleeve 384 extends through the center of the tube-like shaft 334 and includes an enlarged base 386 secured by bolts 388 to the plate 380. The rod 376 extends through the interior of the sleeve 384 into the pocket 356. Bearings 390 at opposite ends of the interior of the sleeve 384 allow relatively free relative rotary movement between the rod 376 and the sleeve 384.

The end of the rod 376 within the pocket 356 mounts a spherical bearing 391 which, in turn, mounts a block 392. The block 402 is sized to be relatively freely movable within the pocket 356 but is also captured therein. The same frictionally engages the righthand side of the plate 360 when the coupling 34 is being extended by the cylinder 36 and will engage the righthand surface of the pocket 356 in the shaft 334 when the cylinder 36 is retracting the coupling 34.

From the foregoing, it will be appreciated that the coupling 34 is totally sealed and, in the usual case, a liquid lubricant will be located in the interior thereof at a level extending at least up to the centerline of the coupling 34. However, because the coupling is extendable, its volume will vary depending on the degree of extension or retraction of the shaft 334 with respect to the tube 328. Accordingly, a vent tube 394 extends through the interior 172 of the bell-shaped casting 170 to the exterior of the dynamometer 32 to a reservoir or the like (not shown) having an opening above the level of the lubricant within the coupling 34 when the same is fully retracted. The tube 394 is in fluid communication with the interior of the coupling via a bore 396 in the plate 380.

With respect to the coupling 34 generally, the purpose of the floating construction including the block 402 is to provide a connection whereby the chuck 28 may be moved axially for engagement or disengagement of the power source to be tested and yet eliminate the imposition of bending stresses on the rod 376 when there is misalignment between the rotational axis of the power source and that of the dynamometer which are accommodated by the coupling 34.

In general, the block 402 is sized so that it will never contact the interior cylindrical wall of the pocket 356 regardless of the amount of skewing of the coupling with respect to the rotational axis of the dynamometer.

It will also be observed that the exterior surface of the sleeve 384 is spaced from the interior surface of the bore in the hollow shaft 334 and yet extends substantially the entire length of the shaft 334. The purpose of the sleeve 384 is to support the chuck 28 when disengaged from a power source to be tested. The connections in the coupling including the spherical splined surfaces 310 and 326 would allow sufficient movement about the points 312 and 320, respectively, such that the chuck would droop under its own weight to the point where it could not align itself with the rotary power source to be tested through the camming action mentioned earlier if it were not supported. The sleeve 384 provides such support through contact with the interior surface of the hollow shaft 334 and thus eliminates any need for an external support and/or guide for the chuck 28.

Preferably, the spacing between the sleeve 384 and the shaft 334 is just slightly greater than the maximum offset that can be permitted by design parameters when the coupling is being driven by a power source engaged by the chuck 28. This prevents rubbing contact of the shaft 334 with the sleeve 384 when the dynamometer is being driven and yet minimizes the amount of drooping of the chuck that is permitted to occur.

It is also to be observed that the components, including the spring housing 374 and the cylinder 36, will generally not be provided in the same unit. Where the cylinder 36 is utilized, it will generally have its rod 370 connected directly to the rod 376 and the degree of constant axial biasing force applied to the chuck can be regulated by controlling the back pressure of hydraulic fluid within the cylinder 36.

Where the spring housing 374 and related components are utilized, the righthand end thereof, as viewed in FIG. 5, will generally be connected to the plates 136 (FIG. 2) directly and the components sized so that the spring 382 will fully extend the coupling 34 when there is no resisting force applied to the chuck 28. In such a case, the dynamometer will be advanced to engage the chuck 28 with a sprocket 22 solely by the motors 27 (FIG. 1) and as the chuck 28 engages the sprocket, the spring 382 will begin to compress until movement of the dynamometer is terminated at some time whereat the spring will provide the desired constant axial biasing force to the chuck 28.

Returning to FIGS. 3 and 4, each of the rings 68, which, it will be recalled, mount the inner bearing races 70, journalling the dynamometer for rotation relative to the base, mount by means of certain ones of the bolts 72, three angularly spaced, radially inwardly extending plates 404. Each of the plates 404, near its radially inner extremity, mounts axially projecting dowels 406 which extend toward the front or the rear of the dynamometer as the case may be.

Those skilled in the art will appreciate that while the dynamometer is journalled for rotation relative to the base, the amount of actual relative rotation will be minute due to the restraining influence of the linkage including the transducer 110. Because of the large forces imposed upon the dynamometer when testing a power source and the vibration associated therewith, the rolling elements 76 will tend to "Brinell" into the inner and outer races 70 and 74, respectively. The pockets that would be formed by such Brinelling would resist relative rotation between the dynamometer and the base and thus absorb power applied to the dynamometer prior to its being measured by the transducer 110 resulting in an inaccurate reading. Thus, in order to ensure accurate readings, it is necessary to avoid Brinelling of the bearing races and the structure including the plates 404 and the dowels 406 are utilized for this purpose. Specifically, it is only necessary to interpose a tool, such as a prybar between the dowels 406 and apply a rotative force therethrough to the rings 68. The resulting rotation of the rings 68 will rotate the inner race 70 relative to the outer race 74 of the corresponding bearing by reason of the connection of the inner race 70 to the ring 68 via the bolts 72. As a consequence, the rolling elements 76 will move relative to both the inner and outer races 70 and 74, respectively, to assume new positions with respect to each. Thus, through periodic rotation of the ring 68, pockets in the races 70 and 74 due to Brinelling can be avoided, with the resultant elimination of power absorption caused thereby to provide accurate readings of power application to the dynamometer. Since the rings 68 can move within the base for the purpose of rotating the bearing races, it will be appreciated that they can axially shift within the base as well.

To prevent such axial shifting to the point where the rings 68 could be displaced from the base, as seen in FIGS. 2 and 4, the forward and rear inner races 70 of the bearings extend radially outwardly sufficiently to engage the plate 46 or 48, as the case may be. That is, the plates 46 and 48 act as stops limiting axial movement of the dynamometer 32 through engagement with the bearing races 70. Some spacing is desirable and the same can be controlled to any desired degree by the simple expedient of interposing shims between either or both of the adapter plates 80 and 82 and the corresponding outer race 74 of the bearing mounted thereby.

Returning to FIG. 1, meters 410 and 412 are connected by lines 414 and 416, respectively, to the transducers 110 of the respective ones of the dynamometers 32.

When a hydraulic vehicle, for example, is to be tested, the dynamometers 32 are engaged with the motive outputs thereof in the manner mentioned previously and the brakes of each dynamometer are fully or partially engaged to stall or partially stall the respective output of the vehicle. Consequently, each of the meters 410 and 412 will provide an indication to the operator of the power required to obtain the desired degree of stall, usually in units of torque. The two readings may be compared to determine whether the respective outputs are balanced to the point of being within specification. If so, the test may be regarded as completed or other test procedures performed. If not, conventional adjustments may be made to one or both of the hydrostatic drive systems in the vehicle to bring them into the desired relationship, usually a balanced relationship.

From the foregoing, it will be appreciated that a test stand made according to the invention and the various inventive components described herein possess numerous advantages over prior art devices. Testing of a vehicle utilizing the stand is easy to set up and the use of expensive and complicated treadmills, which may also be power-absorbing, is avoided. The unique coupling employed herein positively couples the chuck to the dynamometer and yet, by reason of its limited play, ensures proper alignment during positive engagement of the chuck with the output of a vehicle to be tested.

The use of an oil cooled disc brake provides a relatively low cost power absorber capable of providing accurate measurements of power at low speeds and/or high torque outputs. And, while the same has been described and illustrated herein as a hydraulically-engaged, spring-disengaged brake, those skilled in the art will recognize that a spring-engaged, hydraulically-disengaged brake can also be used with efficacy.

The embodiments of the invention in which an exclusive property or privilege is claimed are defined as follows:

1. A dynamometer comprising:
   a base;
   a housing mounted on said base for rotation about an axis, said housing including first and second parts relatively rotatable about said axis and defining a chamber;
   interleaved brake discs defining a brake pack within said chamber, some of said discs carried by said first housing part and others carried by said second housing part;
   a hydraulic piston within said chamber for compressing said pack;
   axially directed coolant inlet and outlet ports in said housing and communicating with said chamber;
   a transducer connected to one of said housing parts and to said base; and
   a rotatable chuck drivingly connected to the other of said housing parts.

2. The dynamometer of claim 1 wherein said chuck comprises a cylindrical element having axially directed teeth.

3. The dynamometer of claim 1 wherein said chuck is rotatable about said axis.

4. The dynamometer of claim 1 further including a pair of parallel rails, means mounting said base on said rails for sliding movement thereon, and a motor for moving said base on said rails.

5. The dynamometer of claim 4 wherein said chuck is drivingly connected to said housing other part by an axially extendable coupling, and a motor for selectively extending said coupling.

6. A dynamometer comprising:
   a base;
   a tubular element mounted for rotation about its longitudinal axis on said base;
   a first drum secured to said tubular element on the exterior thereof and having radially directed splines on a surface thereof;
   a second drum journalled on said tubular element and having radially directed splines on a surface thereof;
   the splines on said drums being directed towards each other;
   said drum surfaces being spaced from each other;
   said drums and said surfaces defining a chamber;
   a pack of brake discs within said chamber with some discs splined to said first drum and others splined to said second drum;
   means for selectively compressing said pack;
   a chuck for engagement with a mechanical device to be tested;
   an axially extendable coupling interconnecting said chuck and said second drum;
   a reciprocal motor at least partially received in said tubular element for selectively extending said coupling; and
   a force measuring device connected between said base and said first drum.

7. The dynamometer of claim 6 wherein said coupling includes means allowing limited play in the radial direction so that said chuck may engage a mechanical device and align radially therewith.

8. The dynamometer of claim 7 wherein said coupling is tubular and wherein said chuck includes a cavity located on said axis; said reciprocal motor includes a road extending through said tubular element and said coupling with its end in said cavity; and a block loosely received, but confined within, said cavity and universally pivoted on said rod end.

9. The dynamometer of claim 6 wherein said coupling comprises a first tube having an exterior spline on one end, a second tube having an interior spline along its interior and engaged with said exterior spline, said second tube further including an exterior, spherical splined surface having its center substantially on said axis, and splines secured to said second drum engaging said spherical splined surface.

10. The dynamometer of claim 6 wherein said chamber is sealed and is adapted to receive a coolant, and further including axially directed inlet and outlet ports in fluid communication with the interior of said chamber.

11. A testing apparatus comprising:
    a shaft having radially outwardly directed splines;
    a first tube slidably receiving said shaft and having radially inwardly directed splines on the interior thereof in engagement with the splines on said shaft and a convex splined surface on the exterior thereof and remote from one end thereof, the center of said spherical splined surface lying on the longitudinal axis of said shaft;
    one set of said radially directed splines having a relatively short axial length and the other having a relatively long axial length;
    a second tube receiving said first tube and having interior splines in engagement with the convex splined surface, the remainder of the interior surface of said second tube being spaced from the exterior of said first tube;
    means including a second convex splined surface having its center on said longitudinal axis and longitudinally spaced from said first tube convex splined surface;

means carried by said second tube including a splined interior surface in engagement with said second convex splined surface;

a chuck for engagement with a mechanical device to be tested, mounted and secured to said shaft; and a dynamometer having a rotary input secured to said means including said second convex splined surface.

12. A dynamometer comprising:

a housing comprised of first and second parts relatively rotatable about an axis;

at least one brake element within said housing carried by one part and frictionally engageable with the other part;

means for moving said element to frictionally engage or disengage the same;

a base;

a bearing mounted on said base and journalling said housing for rotation, said bearing including inner and outer races, one of said races being associated with said housing and the other being associated with said base, and a plurality of rolling elements interposed between said races;

means rotatably mounting at least one of said races to the associated one of said base and said housing so that said one race may be disposed in any of a plurality of differing, angularly spaced positions about said axis with respect to the one of the housing and the base mounting the same;

a transducer connected to one of said parts and said base and restraining said housing against substantial rotation in said bearing; and a coupling device connected to the other of said parts and including means for driven engagement with a mechanical power source.

13. The dynamometer of claim 12 wherein said mounting means comprises a ring mounting said one race and rotatably received on the associated one of said base and said housing and an exposed formation on said ring to which a relative force may be applied.

14. A dynamometer assembly comprising:

a dynamometer having a rotary input;

a chuck for engagement with a rotary power source to be tested;

an axially extendable coupling interconnecting said chuck and said dynamometer;

spring means for biasing said chuck away from said dynamometer to extend said coupling;

means mounting said dynamometer for movement along a predetermined path; and motor means for moving said dynamometer along said path.

15. A dynamometer assembly comprising:

a dynamometer having a rotary input;

a chuck for engagement with a rotary power source to be tested;

an axially extendable coupling interconnecting said chuck and said dynamometer; and reciprocal motor means energized to bias said chuck away from said dynamometer to extend said coupling.

* * * * *